US006642297B1

(12) United States Patent
Hyatt et al.

(10) Patent No.: US 6,642,297 B1
(45) Date of Patent: Nov. 4, 2003

(54) POLYMER COMPOSITE MATERIALS FOR ELECTROSTATIC DISCHARGE PROTECTION

(75) Inventors: Hugh M. Hyatt, Bremerton, WA (US); Louis P. Rector, Allegany, NY (US)

(73) Assignee: Littelfuse, Inc., Des Plaines, IL (US)

(*) Notice: Subject to any disclaimer, the term of this patent is extended or adjusted under 35 U.S.C. 154(b) by 0 days.

(21) Appl. No.: 09/232,387

(22) Filed: Jan. 15, 1999

Related U.S. Application Data

(60) Provisional application No. 60/071,821, filed on Jan. 16, 1998.

(51) Int. Cl.[7] .............................. C08J 5/10; C08K 3/34; C08L 83/00

(52) U.S. Cl. ........................ 524/492; 524/404; 524/442; 524/444; 524/428; 523/209; 523/212

(58) Field of Search ................................ 524/492, 442, 524/443, 404, 439, 428, 414, 444; 523/209, 212

(56) References Cited

U.S. PATENT DOCUMENTS

| | | | | |
|---|---|---|---|---|
| 2,273,704 A | | 2/1942 | Grisdale | |
| 2,796,505 A | | 6/1957 | Bocciarell | |
| 3,685,026 A | | 8/1972 | Wakabayashi et al. | |
| 3,685,028 A | | 8/1972 | Wakabayashi et al. | |
| 3,772,774 A | * | 11/1973 | Knippenberg et al. | 29/624 |
| 4,045,712 A | | 8/1977 | DeTommasi | |
| 4,252,692 A | | 2/1981 | Taylor et al. | |
| 4,331,948 A | | 5/1982 | Malinaric et al. | |
| 4,359,414 A | | 11/1982 | Mastrangelo | |
| 4,726,991 A | | 2/1988 | Hyatt et al. | |
| 4,977,357 A | | 12/1990 | Shrier | |
| 4,992,333 A | | 2/1991 | Hyatt | |
| 5,068,634 A | | 11/1991 | Shrier | |
| 5,099,380 A | | 3/1992 | Childers et al. | |
| 5,142,263 A | | 8/1992 | Childers et al. | |
| 5,183,698 A | | 2/1993 | Stephenson et al. | |
| 5,189,387 A | | 2/1993 | Childers et al. | |
| 5,246,388 A | | 9/1993 | Collins et al. | |
| 5,248,517 A | | 9/1993 | Shrier et al. | |
| 5,260,848 A | | 11/1993 | Childers | |
| 5,262,754 A | | 11/1993 | Collins | |
| 5,278,535 A | | 1/1994 | Xu et al. | |
| 5,294,374 A | | 3/1994 | Martinez et al. | |
| 5,340,641 A | | 8/1994 | Xu | |
| 5,393,597 A | | 2/1995 | Childers et al. | |
| 5,476,714 A | | 12/1995 | Hyatt | |
| 5,669,381 A | | 9/1997 | Hyatt | |
| 5,781,395 A | | 7/1998 | Hyatt | |
| 5,807,509 A | | 9/1998 | Shrier et al. | |
| 5,958,537 A | * | 9/1999 | Akhter | 428/40.2 |

FOREIGN PATENT DOCUMENTS

WO WO 97/21230 6/1997

OTHER PUBLICATIONS

*European Search Report—EP Application No. 99300315—Apr. 22, 1999.*

*International Search Report—International Application No. PCT/US98/23493—Mar. 3, 1999.*

* cited by examiner

*Primary Examiner*—James J. Seidleck
*Assistant Examiner*—U. K. Rajguru
(74) *Attorney, Agent, or Firm*—Bell, Boyd & Lloyd LLC

(57) ABSTRACT

A composition for providing protection against electrical overstress (EOS) comprising an insulating binder, doped semiconductive particles, and semiconductive particles. The composite materials exhibit a high electrical resistance to normal operating voltage values, but in response to an EOS transient switch to a low electrical resistance and clamp the EOS transient voltage to a low level for the duration of the EOS transient.

32 Claims, 4 Drawing Sheets

POLYMER COMPOSITE MATERIALS FOR ELECTROSTATIC DISCHARGE PROTECTION

This application claims benefit of provisional application Ser. No. 60/071,821, filed Jan. 16, 1998.

TECHNICAL FILED

The present invention relates generally to the use of polymer composite materials for the protection of electronic components against electrical overstress (EOS) transients.

BACKGROUND OF THE INVENTION

There is an increased demand for electrical components which can protect electronic circuits from EOS transients which produce high electric fields and usually high peak powers capable of destroying circuits or the highly sensitive electrical components in the circuits, rendering the circuits and the components non-functional, either temporarily or permanently. The EOS transient can include transient voltage or current conditions capable of interrupting circuit operation or destroying the circuit outright. Particularly, EOS transients may arise, for example, from an electromagnetic pulse, an electrostatic discharge, lightening, or be induced by the operation of other electronic or electrical components. Such transients may rise to their maximum amplitudes in microsecond to subnanosecond time frame, or less, and may be repetitive in nature. A typical waveform of an electrical overstress transient is illustrated in FIG. 1. The peak amplitude of the electrostatic discharge (ESD) transient wave may exceed 25,000 volts with currents of more than 100 amperes. There exist several standards which define a simulation waveform of the EOS transient. These include IEC 1000-4-2, ANSI guidelines on ESD (ANSI C63.16), DO-160, and FAA-20-136. There also exist military standards, such as MIL STD 461/461 and MIL STD 883 part 3015.

Materials for the protection against EOS transients (EOS materials) are designed to respond essentially instantaneously (i.e., ideally before the transient wave reaches its peak) to reduce the transmitted voltage to a much lower value and clamp the voltage at the lower value for the duration of the EOS transient. EOS materials are characterized by high electrical resistance values at low or normal operating voltages and currents. In response to an EOS transient, the material switches essentially instantaneously to a low electrical resistance value. When the EOS threat has been mitigated these materials return to their high resistance value. These materials are capable of repeated switching between the high and low resistance states, allowing circuit protection against multiple EOS events. EOS materials are also capable of recovering essentially instantaneously to their original high resistance value upon termination of the EOS transient. For purposes of this application, the high resistance state will be referred to as the "off-state" and the low resistance state will be referred to as the "on-state." This transition between resistance states is not a step function, instead transitioning between the off-state and the on-state in a non-linear manner. These materials which are subject of the claims herein have withstood thousands of ESD events and recovered to desired off-states after providing protection from each of the individual ESD events.

FIG. 2 illustrates a typical electrical resistance versus d.c. voltage relationship for EOS materials. Circuit components including EOS materials can shunt a portion of the excessive voltage or current due to the EOS transient to ground, thus, protecting the electrical circuit and its components. The major portion of the threat transient is reflected back towards the source of the threat. The reflected waive is either attenuated by the source, radiated away, or re-directed back to the surge protection device which responds with each return pulse until the threat energy is reduced to safe levels.

U.S. Pat. No. 2,273,704, issued to Grisdale, discloses granular composites which exhibit non-linear current voltage relationships. These mixtures are comprised of granules of conductive and semiconductive granules that are coated with a thin insulative layer and are compressed and bonded together to provide a coherent body.

U.S. Pat. No. 2,796,505, issued to Bocciarelli, discloses a non-linear voltage regulating element. The element is comprised of conductor particles having insulative oxide surface coatings that are bound in a matrix. The particles are irregular in shape and make point contact with one another.

U.S. Pat. No. 4,726,991, issued to Hyatt et al., discloses an EOS protection material comprised of a mixture of conductive and semiconductive particles, all of whose surfaces are coated with an insulative oxide film. These particles are bound together in an insulative binder. The coated particles are preferably in point contact with each other and conduct preferentially in a quantum mechanical tunneling mode.

U.S. Pat. No. 5,476,714, issued to Hyatt, discloses EOS composite materials comprised of mixtures of conductor and semiconductor particles in the 10 to 100 micron range with a minimum proportion of 100 angstrom range insulative particles, bonded together in a insulative binder. This invention includes a grading of particle sizes such that the composition causes the particles to take a preferential relationship to each other.

U.S. Pat. No. 5,260,848, issued to Childers, discloses foldback switching materials which provide protection from transient overvoltages. These materials are comprised of mixtures of conductive particles in the 10 to 200 micron range. Semiconductor and insulative particles are also used in this invention. The spacing between conductive particles is at least 1000 angstroms.

Examples of prior EOS polymer composite materials are also disclosed in U.S. Pat. Nos. 4,331,948, 4,726,991, 4,977,357, 4,992,333, 5,142,263, 5,189,387, 5,294,374, 5,476,714, and 5,669,381.

None of these prior patents disclose an EOS composition comprising a doped semiconductor. Further, it has yet to be recognized that the switching characteristics of an EOS composition can be controlled by varying the level of doping of a semiconductor. The present invention meets these and other needs.

SUMMARY OF THE INVENTION

In a general aspect of the present invention there is provided polymer composite materials which exhibit a high electrical resistance to normal operating voltage values, but in response to an EOS transient switch to a low electrical resistance and clamp the EOS transient voltage to a low level for the duration of the EOS transient.

In a first embodiment of the present invention the EOS composition comprises an insulating binder, doped semiconductive particles, and semiconductive particles.

In a second embodiment of the present invention the EOS composition comprises an insulating binder, semiconductive particles doped to have a first electrical conductivity, and semiconductive particles doped to have a second electrical conductivity.

In a third embodiment of the present invention the EOS composition comprises an insulating binder, conductive particles composed of an inner core and an outer shell, and semiconductive particles. The inner core of the conductive particles comprises an electrically insulating material and the outer shell comprises one of the following materials: (i) a conductor; (ii) a semiconductor; (iii) a doped semiconductor; or (iv) an insulating material other than the material comprising the inner core. Alternatively, the inner core of the conductive particle may comprise a semiconductive material and the outer shell comprise one of the following materials: (i) a conductor; (ii) a semiconductive material other than the material comprising the inner core; or (iii) a doped semiconductor. In yet a further alternative embodiment wherein the conductive particles are comprised of a core-shell structure, the inner core is comprised of a conductive material and the outer shell is comprised of one of the following materials: (i) a conductive material other than the material comprising the inner core; (ii) a semiconductor; or (iii) a doped semiconductor.

In a fourth embodiment of the present invention the EOS composition comprises an insulating binder, conductive particles composed of an inner core and an outer shell, and doped semiconductive particles. The materials of the core-shell structured conductive particles may include any one of the combinations set forth above with respect to the third embodiment of the present invention.

Finally, each embodiment of the present invention may optionally include small amounts of insulative particles.

Other advantages and aspects of the present invention will become apparent upon reading the following description of the drawings and detailed description of the invention.

Brief Description of the Drawings

In order that the present invention may be understood, it will now be described by way of example with reference to the following drawings.

Detailed Description of the Invention

Figure 1:
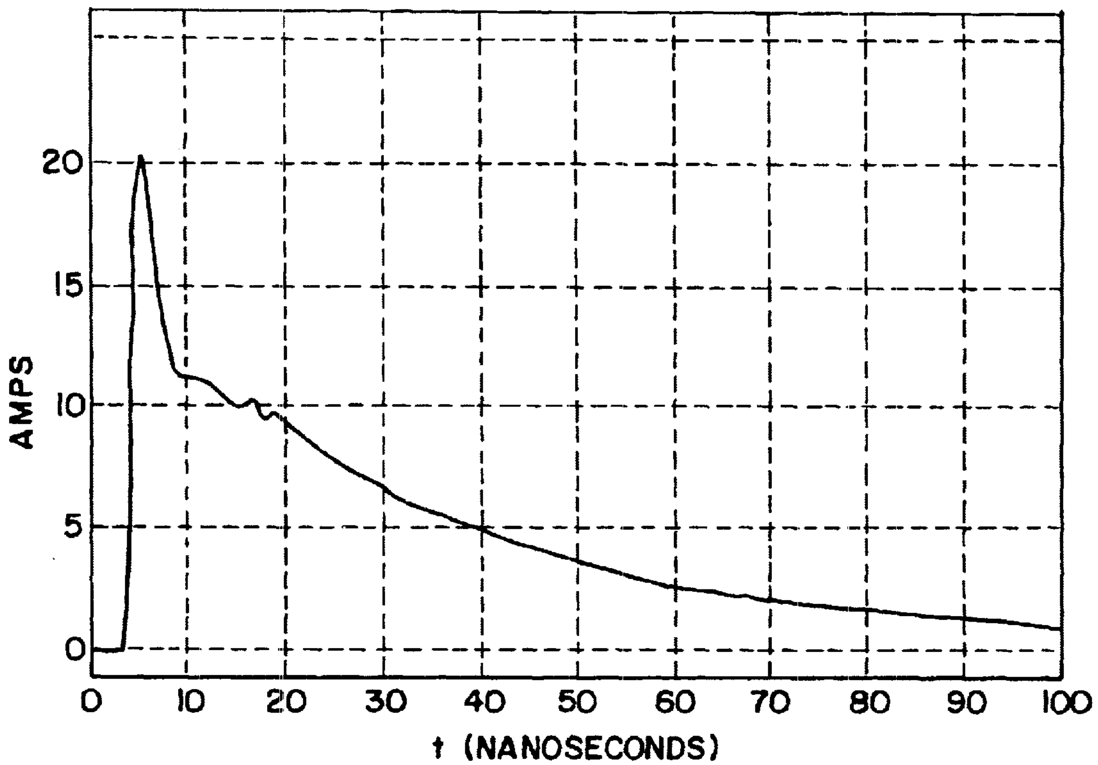
FIG. 1 graphically illustrates a typical current waveform of an EOS transient.
Figure 2:
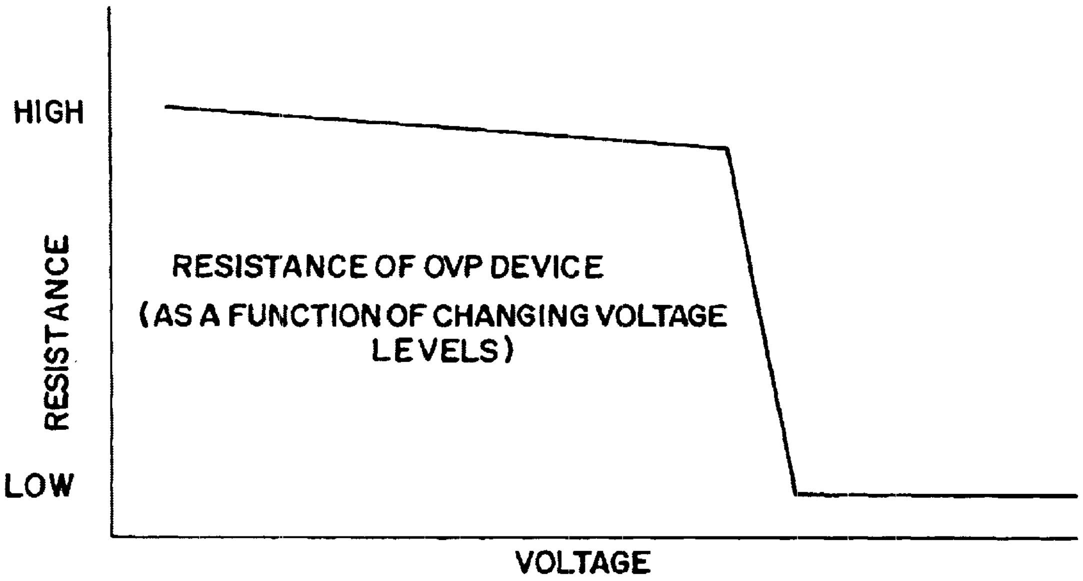
FIG. 2 graphically illustrates the electrical resistance versus d.c. voltage relationship of typical EOS materials.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 3:
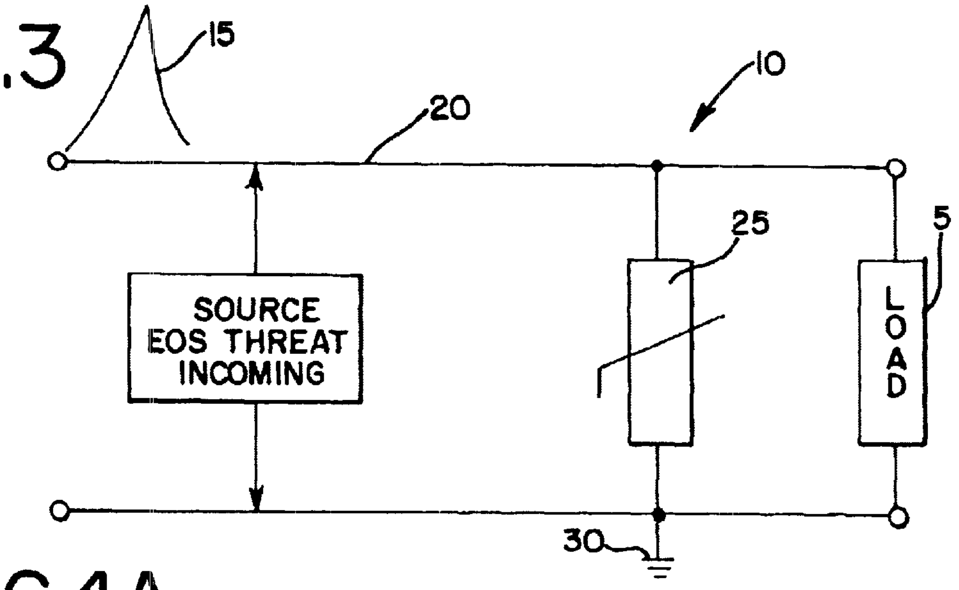
FIG. 3 illustrates a typical electronic circuit including a device having an EOS composition according to the present invention.

With reference to FIG. 3, electrical devices including compositions made according to the present invention provide electrical circuits and circuitry components with protection against incoming EOS transients. The circuit load 5 in FIG. 3 normally operates voltages less than a predetermined voltage $V_n$. EOS transient threats of more than two and three times the predetermined operating voltage $V_n$ with sufficient duration can damage the circuit and the circuit components. Typically, EOS threats exceed the predetermined operating voltages by tens, hundreds, or even thousands of times the voltages seen in normal operation. In FIG. 3, an EOS transient voltage 15 is shown entering the circuit 10 on electronic line 20. As previously mentioned the EOS transient voltage can result from an electromagnetic pulse, an electrostatic discharge or lightning. Upon application of the EOS transient voltage 15, the electrical overstress protection device 25 switches from the high resistance off-state to a low resistance on-state thus clamping the EOS transient voltage 15 to safe, low value and shunting a portion of the threat electrical current from the electronic line 20 to the system ground 30. The major portion of the threat transient is reflected back towards the source of the threat.

In the first preferred embodiment, the EOS switching material of the present invention utilizes semiconductive particles doped to become electrically conductive and semiconductive particles dispersed in an insulating binder using standard mixing techniques. In the second preferred embodiment, the EOS switching material is comprised of an insulating binder having semiconductive particles doped to different electrical conductivities dispersed therein. Optionally, the first and second preferred embodiments may include insulative particles.

The insulating binder in both the first and second preferred embodiments is chosen to have a high dielectric breakdown strength, a high electrical resistivity and high tracking resistance. The switching characteristics of the composite materials are determined by the nature of the doped semiconductive particles, semiconductive particles, the particle size and size distribution, and the interparticle spacing. The interparticle spacing depends upon the percent loading of the doped semiconductive and semiconductive particles, and on their size and size distribution. In the compositions of the present invention, interparticle spacing will generally be greater than 1,000 angstroms. Additionally, the insulating binder must provide and maintain sufficient interparticle spacing between the doped semiconductive and semiconductive particles to provide a high off-state resistance. The desired off-state resistance is also affected by the resistivity and dielectric strength of the insulating binder. Generally speaking the insulating binder material should have a volume resistivity at least $10^9$ ohm-cm.

In the third preferred embodiment, the EOS switching material of the present invention comprises conductive particles composed of an inner core and an outer shell and semiconductive particles dispersed in an insulating binder. In the fourth preferred embodiment, the EOS switching material of the present invention comprises conductive particles composed of an inner core and an outer shell and doped semiconductive particles dispersed in an insulating binder. Optionally, the third and fourth embodiments may include insulative particles.

Excellent results have been obtained when the core and the shell of the particles comprising the conductive phase have different electrical conductivities. For example, if the inner core of the conductive particles is comprised of an electrically insulating material, the outer shell may be comprised of one of the following materials: (i) a conductor; (ii) a doped semiconductor; (iii) a semiconductor; or (iv) an insulating material other than the insulating material of the inner core. The inner core of the conductive particles may be comprised of a semiconductive material. In such a composition, the outer shell may be comprised of one of the following materials: (i) a conductor; (ii) a doped semiconductor; or (iii) a semiconductive material other than the semiconductive material of the inner core. Finally, the inner core may be comprised of a conductive material, in which case the outer shell may be comprised of one of the following materials: (i) a semiconductor; (ii) a doped semiconductor; or (iii) a conductive material other than the conductive material of the inner core.

Materials

Generally, the materials for use in the present invention fall into one of four categories: an insulator; a conductor; a semiconductor; and a doped semiconductor. The energy bands, energy band gaps and allowed electron states distinguish one category of materials from another, resulting in the materials having distinct electrical properties. In materials generally, energy bands are permitted to exist above and below the energy band gap. The energy bands above the energy gap are commonly known as conduction bands, while the energy bands below the energy gap are commonly known as valence bands. A more detailed description of the electrical characteristics of these categories of materials, including energy bands, energy band gaps and allowed electron states can be found in *Physics of Semiconductor Devices*, S. M. Sze, John Wiley & Sons, 1981, and in *Introduction to Solid State Physics*, C. Kittel, John Wiley & Sons, 1996, disclosure of which is incorporated herein by reference.

Figures 6A, 6B, 6C, 6D, 6E:
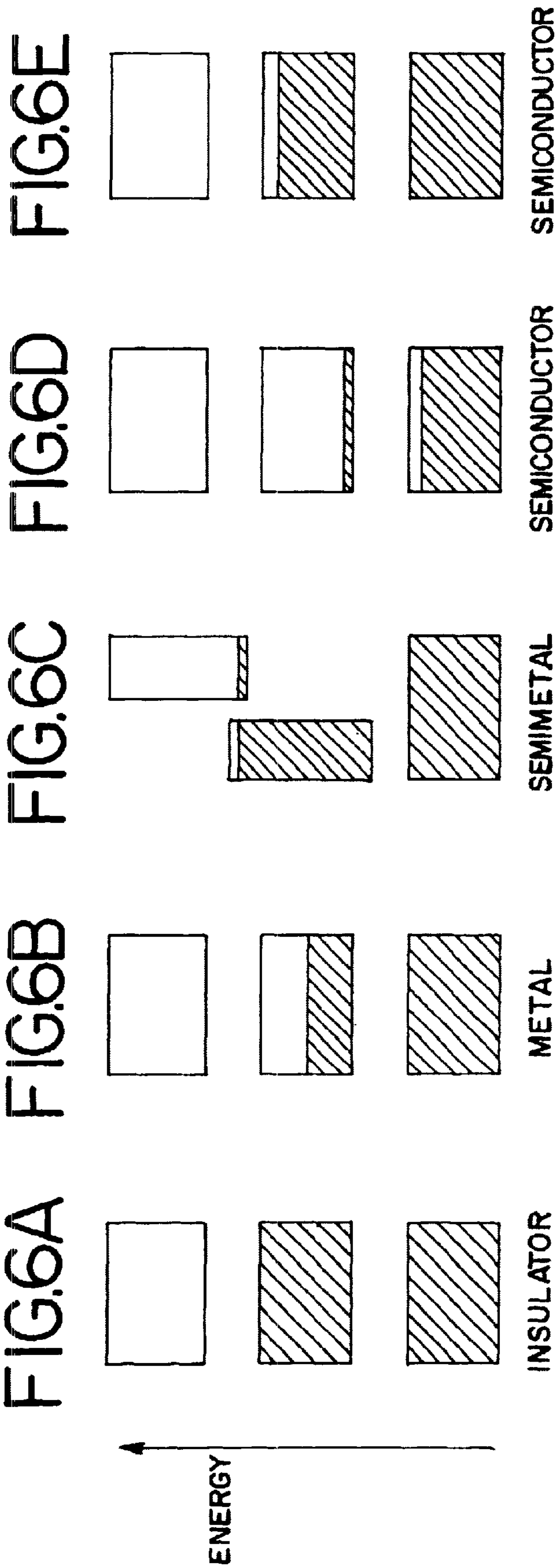
FIGS. 6A–6E illustrate electron occupancy of allowed energy bands for an insulating material, a metal, a semimetal, and a semiconductor, respectively.

With reference to FIGS. 6A–6E, the electron occupancy of the uppermost allowed energy bands is illustrated for an insulator, a metal, a semimetal, a pure semiconductor with thermally excited electron carriers (i.e., at some finite temperature), and a doped semiconductor which is electron-deficient due to the added impurities. In FIGS. 6A–6E, the boxes represent energy bands of the material and shaded areas represent band regions filled with electrons. Referring to FIG. 6A, a completely filled valence band and an empty conduction band results in a material being electrically insulative. On the other hand, as shown in FIG. 6B, a partially-filled conduction band such as present in a metal allows free movement of electrons and results in the material being electrically conductive. A semimetal has a small concentration of conduction electrons in the conduction band and is therefore a relatively poor electrical conductor (FIG. 6C).

In a pure semiconductor at zero degrees Kelvin (not illustrated), the valence band is completely filled with electrons. The next higher energy level band, the conduction band, is empty. In this state, a pure semiconductive material acts as an insulator. As the temperature increases, electrons are thermally excited from the valence band to the conduction band. This thermally excited state is illustrated in FIG. 6D. Both the conduction band electrons and the holes left (by the electrons) in the valence band contribute to electrical conductivity. Thus, this material is intrinsically semiconductive over the increased temperature range. The level of electrical conduction in a thermally excited semiconductor is characterized by the energy difference between the lowest point of the conduction band and the highest point of the valence band, i.e., the energy band gap.

Figure 7:
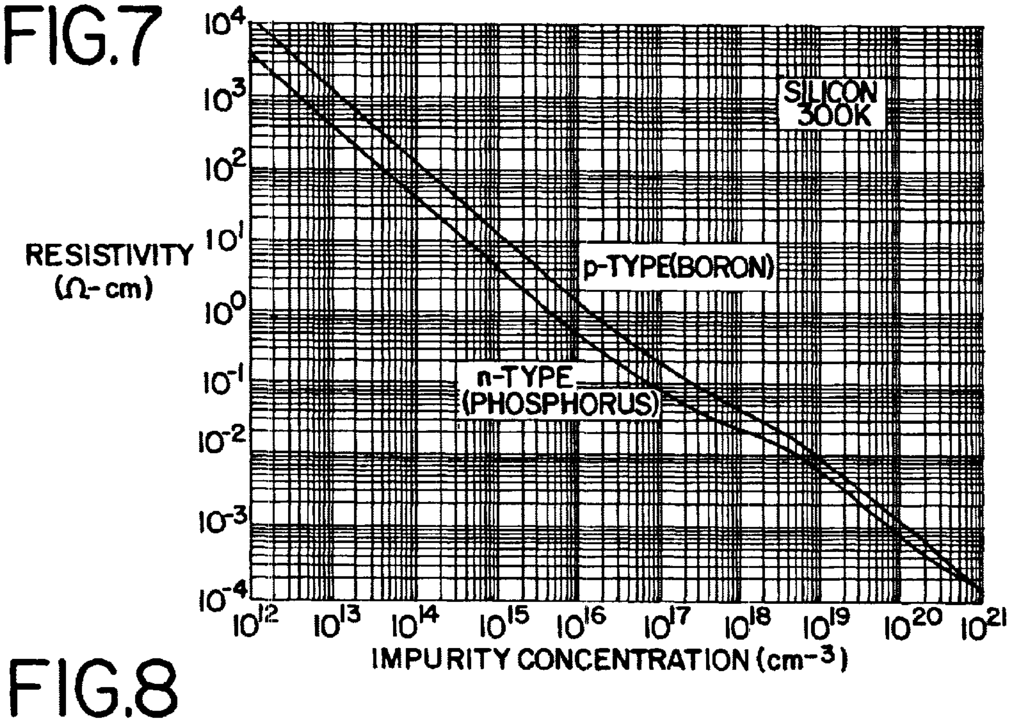
FIG. 7 graphically illustrates the resistivity of silicon versus impurity concentration at 300K.
Figure 8:
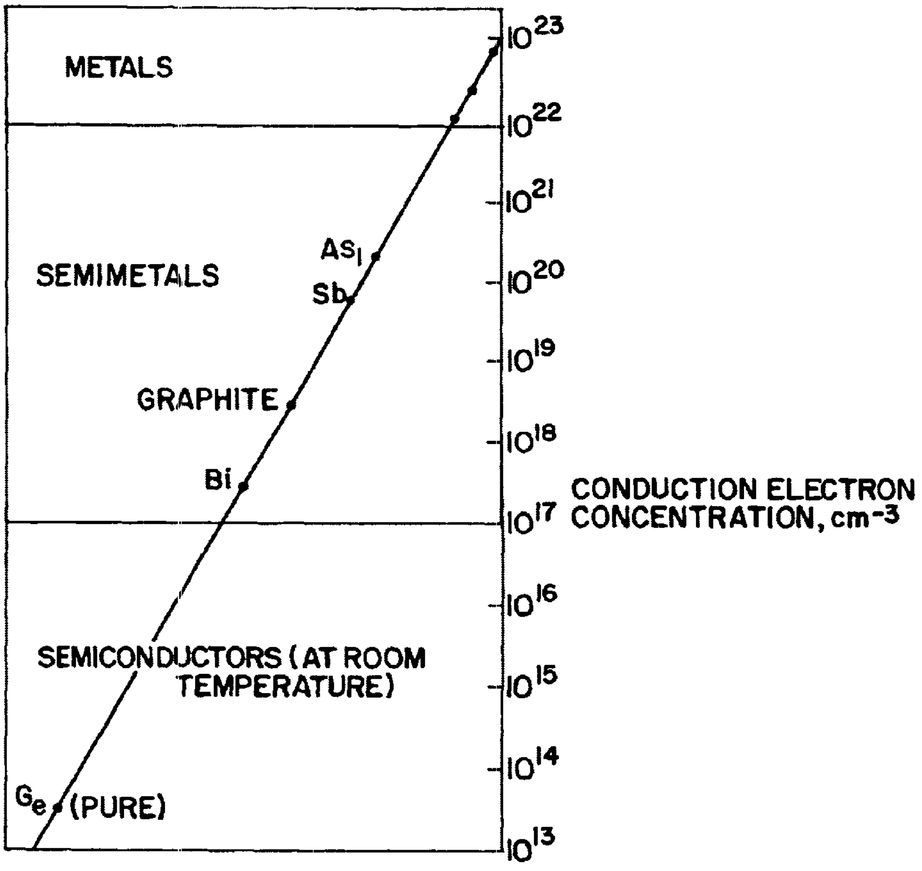
FIG. 8 graphically illustrates electron carrier concentrations for metals, semimetals and semiconductors.

The addition of certain impurities (dopants) dramatically affects the electrical conductivity of a semiconductor. The impurity or material used to dope the semiconductor material may be either an electron donor or an electron acceptor. In either case, the impurity occupies the energy level within the energy band gap of an otherwise pure semiconductor. FIG. 6E illustrates the allowed energy bands of a doped semiconductor which is electron-deficient due to the presence of impurities. By increasing or decreasing the impurity concentration in a doped semiconductor one may vary the electrical conductivity of the material. For example, referring to FIG. 7, the electrical conductivity of silicon will vary by approximately eight orders of magnitude depending on the concentration of an impurity (e.g., boron or phosphorous). FIG. 8, illustrates conduction electron concentrations for semiconductors, semimetals and metals. The electrical conductivity of a pure semiconductor may be extended upward (into the range of a semimetal or metal) by increasing the conduction electron concentration, or may be extended downward (into the range of an insulator) by decreasing the conduction electron concentration.

For purposes of the present invention, a semiconductive material is a material that has an energy band gap in which allowed energy states do not exist. A doped semiconductive material is a material in which doping impurities have a characteristic energy state within the energy band gap.

A. Insulative Binders

Suitable insulative binders for use in the present invention include thermoset polymers, thermoplastic polymers, elastomers, rubbers, or polymer blends. The polymers may be cross-linked to promote material strength. Likewise, elastomers may be vulcanized to increase material strength. In a preferred embodiment, the insulative binder comprises a silicone rubber resin manufactured by Dow Coming STI and marketed under the tradename Q4-2901. The silicone resin is cross-linked with a peroxide curing agent; for example, 2,5-bis-(t-butylperoxy)-2,5-dimethyl-1-3-hexyne, available from Aldrich Chemical. The choice of the peroxide curing agent is partially determined by desired cure times and temperatures. Nearly any binder will be useful as long as the material does not preferentially track in the presence of high interparticle current densities.

B. Doped Semiconductive Particles

In one embodiment, the composition of the present invention employs an electrically conductive phase comprised of a semiconductive particle doped with a material to render it electrically conductive. The doped semiconductive particle may be comprised of any conventional semiconductor material, doped with suitable impurities (either electron donors or electron acceptors) which have a characteristic energy state within the energy band gap of the semiconductor material. Among the preferred semiconductor materials are silicon, germanium, silicon carbide, boron nitride, boron phosphide, gallium nitride, gallium phosphide, indium phosphide, cadmium phosphide, zinc oxide, cadmium sulphide and zinc sulfide. Electrically conducting polymers such as polypyrrole or polyaniline are also useful. These materials are doped with suitable electron donors (e.g., phosphorous, arsenic, or antimony) or electron acceptors (e.g., iron, aluminum, boron, or gallium) to achieve a desired level of electrical conductivity.

In an especially preferred embodiment the doped semiconductive particle is a silicon powder doped with aluminum (approximately 0.5% by weight of the doped semiconductive particle) to render it electrically conductive. Such a material is marketed by Atlantic Equipment Engineers under the tradename Si-100-F. In another especially preferred embodiment the doped semiconductive particle is an antimony doped tin oxide marketed under the tradename Zelec 3010-XC.

The doped semiconductive particles preferred for use in the present invention have an average particle size less than 10 microns. However, in order to maximize particle packing density and obtain optimum clamping voltages and switching characteristics, the average particle size of the semiconductive particles is preferably in a range of about 1 to about 5 microns, or even less than 1 micron.

C. Semiconductive Particles

The preferred semiconductive particles for use in the present invention are comprised of silicon carbide. However, the following semiconductive particle materials can also be used in the present invention: silicon, germanium, silicon carbide, boron nitride, boron phosphide, gallium nitride, gallium phosphide, indium phosphide, cadmium phosphide, zinc oxide, cadmium sulphide, and zinc sulphide.

In a preferred embodiment the semiconductive particles are silicon carbide manufactured by Agsco, #1200 grit. In a second preferred embodiment the semiconductive particles are silicon carbide manufactured by Norton, #10,000 grit. The semiconductive particles for use in the present invention have an average particle size of less than 5 microns and preferably in a range of about 1 to about 3 microns.

D. Insulative Particles

In practice, insulative particles for use in the present invention are comprised of fumed silica such as that available under the tradename Cabosil TS-720. It should be understood, however, that other insulative materials can be used. For example, glass spheres, calcium carbonate, calcium sulphate, barium sulphate, aluminum trihydrate, metal oxides such as titanium dioxide, kaolin and kaolinite, and ultra high-density polyethylene (UHDPE) may also be used in the present invention. The insulative particles for use in the present invention have an average particle size in a range of about 50 Angstroms to about 200 Angstroms.

E. Conductive Particles With Core-Shell Structure

Figure 5:
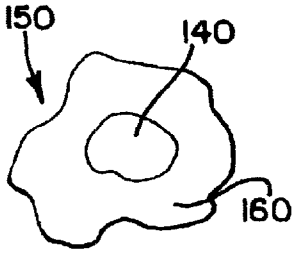
FIG. 5 illustrates a cross section of a core-shell structure of conductive particles according to several embodiments of the present invention.

Referring to FIG. 5, the conductive phase of compositions according to the present invention may have a core-shell structure. The particle 150 has a core 140 surrounded by a shell 160. Conductive materials suitable for use in the conductive core-shell particles includes the following metals and alloys thereof: silver, nickel, copper, gold, platinum, zinc, titanium and palladium. Carbon black may also be used as a conductive material in the present invention. The semiconductive, doped semiconductor and insulating materials described above are also suitable for use in the compositions of the present invention employing the conductive core-shell structured particles.

Specific examples of conductive core-shell particles for us in the present invention include a titanium dioxide (insulator) core and an antimony doped tin oxide (doped semiconductor) shell. Such particles are marketed under the tradename Zelec 1410-T. Another suitable material is marketed under the tradename Zelec 1610-S and includes a hollow silica (insulator) core and an antimony doped tin oxide (doped semiconductor) shell. Particles having a fly ash (insulator) core and a nickel (conductor) shell, and particles having a nickel (conductor) core and silver (conductor) shell are marketed by Novamet are also suitable for use in the present invention. Another suitable alternative, set forth in TABLES 2–5 below, is marketed under the tradename Vistamer Ti-9115 by Composite Particles, Inc. of Allentown, Pa. These conductive core-shell particles have an insulative shell of ultra high-density polyethylene (UHDPE) and a conductive core material of titanium carbide (TiC). Finally, a particle having a carbon black (conductor) core and a polyaniline (doped semiconductor) marketed by Martek Corporation under the tradename Eeonyx F-40-10DG may be used as the conductive core-shell structured particles in the compositions of the present invention.

In the EOS compositions according to the present invention, the insulative binder comprises from about 30 to about 65%, and preferably from about 35 to about 50%, by volume of the total composition. The doped semiconductive particles comprise from about 10 to about 60%, and preferably from about 15 to about 50%, by volume of the total composition. The semiconductive particles comprise from about 5 to about 45%, and preferably from about 10 to about 40%, by volume of the total composition. The insulative particles comprise from about 1 to about 15%, and preferably from about 2 to about 10%, by volume of the total composition.

Through the use of a suitable insulating binder and doped semiconductive, semiconductive and insulating particles having the preferred particle sizes and volume percentages, compositions of the present invention generally can be tailored to provide a range of clamping voltages from about 20 volts to about 2,000 volts. Preferred embodiments of the present invention exhibit clamping voltages from about 20 to about 500 volts, and more preferably from about 20 to about 100 volts.

Figure 4A:
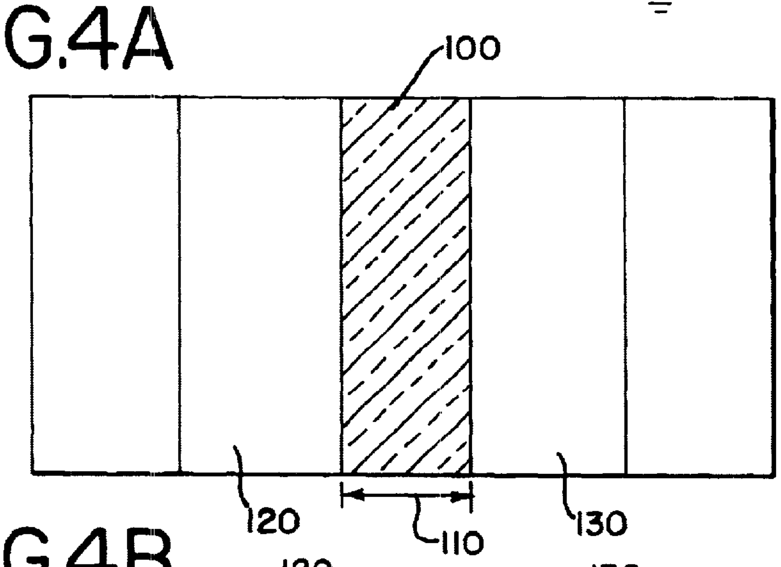
FIGS. 4A–4B illustrate a surface-mount electrical device used to test the electrical properties of the EOS composition according to the present invention.
Figure 4B:
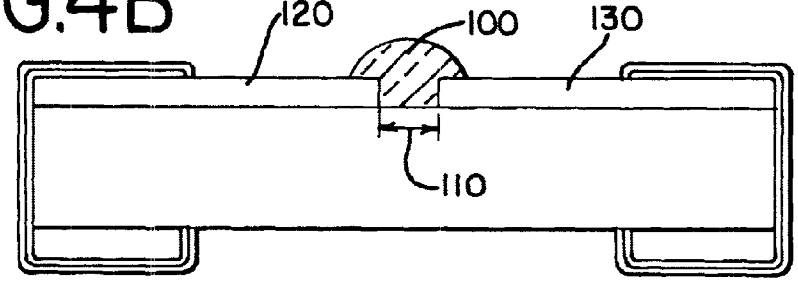

A number of compositions have been prepared by mixing the components in a polymer compounding unit such as a Brabender or a Haake compounding unit. It should be understood by those having skill in the art that standard polymer processing techniques and equipment can be utilized to fabricate the compositions of the present invention, including a two-roll mill, a Banbury mixer, an extruder mixer and other similar mixing equipment. Referring to FIGS. 4A–4B, the compositions 100 were laminated into an electrode gap region 110 between electrodes 120, 130 and subsequently cured under heat and pressure. The response of the materials to: (1) a transmission line voltage pulse (TLP) approximately 65 nanoseconds in duration; and, (2) an EOS transient generated by a KeyTek Minizapper (MZ) have been measured. Various gap widths were tested. The compositions and responses are set forth in TABLES 1–5 below.

TABLE 1

| Notebook (109s) | 109s13 | 109s16 | 109s17 | 109s57 | 109s57 | 109s57 | 109s58 | 109s61 |
|---|---|---|---|---|---|---|---|---|
| Formulation (compositions expressed in volume percentages) | | | | | | | | |
| Zelec ECP-3010-XC (0.7 micron range) | | | | | | | | 15.0 |
| Silicon 1–5 micron range (Atlantic Equipment Engineers) | 45.0 | 50.0 | 55.0 | 50.0 | 50.0 | 50.0 | 45.0 | |
| Silicon Carbide (Norton, #10,000 grit) | | | | 10.0 | 10.0 | 10.0 | 10.0 | 40.0 |
| Silicon Carbide (Agsco, #1200 grit) | 15.0 | 10.0 | 5.0 | | | | | |
| Cabosil TS-720 (Cabot Corporation) | 4.0 | 4.0 | 6.0 | | | | | |
| Binder (Q4-2901) | 36.0 | 36.0 | 34.0 | 40.0 | 40.0 | 40.0 | 45.0 | 45.0 |
| Electrical Performance | | | | | | | | |
| Electrode Gap (mil) | 2 | 2 | 2 | 2 | 4 | 10 | 4 | 10 |
| TLP Results | | | | | | | | |
| Overstress Pulse (kV) | 2 | 2 | 2 | 2 | 2 | 2 | 2 | 2 |
| Clamp voltage (V) at time from leading edge of pulse: | | | | | | | | |
| 25 ns | 89 | 102 | 95 | 152 | 252 | 612 | 241 | 80 |
| 50 ns | 77 | 102 | 90 | 130 | 189 | 525 | 178 | 68 |
| MZ Results | | | | | | | | |
| Overstress Pulse (kV) | 8 | 8 | 8 | 8 | 8 | 8 | 8 | 8 |
| Clamp voltage (V) at time from leading edge of pulse: | | | | | | | | |
| 25 ns | — | — | — | 53 | 94 | 392 | 80 | 67 |
| 50 ns | — | — | — | 48 | 80 | 300 | 72 | 59 |
| 100 ns | — | — | — | 44 | 67 | 207 | 66 | 49 |
| Device Resistance (megohms at 5 V) | 4.6 | 6.0 | 1.8 | 5.6 | 22000 | 1.2E→6 | 20000 | 20000 |

TABLE 2

| Notebook (138s 18R): Sample No. | 1 | 2 | | | | |
|---|---|---|---|---|---|---|
| Formulation (compositions expressed in volume percentages) | | | | | | |
| Dow Corning Stl Q4-2901 | 39.40 | 39.40 | | | | |
| DTPBMH | 0.60 | 0.60 | | | | |
| Ni (Novamet Ni Type 4sp-10) | 30.00 | 30.00 | | | | |
| TiC (VISTAMER Ti-9115) | 15.00 | 15.00 | | | | |
| ZnO (AEE Zn-601) | 15.00 | 15.00 | | | | |
| Electrical Performance | | | | | | |
| Initial Resistance | 559 K | 110 G | | | | |
| Final Resistance | 115 M | 200 G | | | | |
| TLP Results | | | | | | |
| Electrode Gap (mil) | 2.0 | 2.0 | 2.0 | 2.0 | 2.0 | 2.0 |
| Voltage | 500 | 750 | 1000 | 1500 | 1750 | 2000 |
| SAMPLE 1 | | | | | | |
| Imax (A) | 42 | 61 | 100 | 110 | 150 | 170 |
| Overshoot (V) | 210 | 270 | 290 | 330 | 380 | 350 |
| Clamp (V): | | | | | | |
| 25 ns | 100 | 107 | 106 | 115 | 128 | 132 |
| 50 ns | 93 | 98 | 101 | 107 | 107 | 115 |
| SAMPLE 2 | | | | | | |
| Imax (A) | 44 | 75 | 100 | 130 | 160 | 160 |
| Overshoot (V) | 230 | 320 | 390 | 480 | 460 | 460 |
| Clamp (V): | | | | | | |
| 25 ns | 115 | 126 | 138 | 133 | 133 | 145 |
| 50 ns | 111 | 119 | 117 | 114 | 116 | 121 |

TABLE 3

| | | | | | | | | | | | | |
|---|---|---|---|---|---|---|---|---|---|---|---|---|
| Notebook (138s 18R) | | | | | | | | | | | | |
| Gap (mil) | 2.0 | | | | | | | | | | | |
| Test | 4 kV | | | | | | | | | | | |
| MZ Results | | | | | | | | | | | | |
| SAMPLE 1 | | | | | | | | | | | | |
| Pulse | 1 | 2 | 3 | 4 | 5 | 6 | 7 | 8 | 9 | 10 | 15 | 25 |
| Imax (A) | 130 | 180 | 160 | 100 | 160 | 100 | 110 | 200 | 120 | 170 | 170 | 160 |
| Overshoot (V) | 290 | 390 | 330 | 430 | 300 | 470 | 420 | 470 | 530 | 440 | 520 | 490 |
| Clamps (V): | | | | | | | | | | | | |
| 25 ns | 80 | 74 | 87 | 99 | 87 | 80 | 95 | 87 | 70 | 111 | 93 | 82 |
| 50 ns | 74 | 65 | 66 | 89 | 72 | 75 | 80 | 72 | 60 | 89 | 69 | 66 |
| 100 ns | 48 | 61 | 52 | 72 | 67 | 56 | 60 | 59 | 52 | 73 | 44 | 55 |
| 150 ns | 38 | 65 | 46 | 77 | 60 | 44 | 59 | 57 | 41 | 62 | 44 | 61 |
| Initial Resistance | 115 M | | | | | | | | | | | |
| Final Resistance | 41 G | | | | | | | | | | | |
| SAMPLE 2 | | | | | | | | | | | | |
| Pulse | 1 | 2 | 3 | 4 | 5 | 6 | 7 | 8 | 9 | 10 | 15 | 25 |
| Imax (A) | 140 | 200 | 200 | 140 | 200 | 110 | 160 | 180 | 120 | 140 | 120 | 180 |
| Overshoot (V) | 540 | 530 | 420 | 480 | 420 | 590 | 500 | 470 | 630 | 610 | 630 | 600 |
| Clamps (V): | | | | | | | | | | | | |
| 25 ns | 118 | 123 | 127 | 97 | 115 | 109 | 122 | 119 | 124 | 118 | 128 | 109 |
| 50 ns | 99 | 93 | 108 | 73 | 85 | 87 | 94 | 99 | 86 | 101 | 103 | 87 |
| 100 ns | 84 | 74 | 80 | 66 | 71 | 69 | 81 | 70 | 67 | 73 | 83 | 66 |
| 150 ns | 80 | 56 | 69 | 65 | 61 | 60 | 71 | 68 | 64 | 61 | 54 | 46 |
| Initial Resistance | 200 G | | | | | | | | | | | |
| Final Resistance | 694 G | | | | | | | | | | | |

TABLE 4

| | | | | | | | | | | | | |
|---|---|---|---|---|---|---|---|---|---|---|---|---|
| Notebook (138s 18R) | | | | | | | | | | | | |
| Gap (mil) | 2.0 | | | | | | | | | | | |
| Test | 8 kV | | | | | | | | | | | |
| MZ Results | | | | | | | | | | | | |
| SAMPLE 1 | | | | | | | | | | | | |
| Pulse | 1 | 2 | 3 | 4 | 5 | 6 | 7 | 8 | 9 | 10 | 15 | 25 |
| Imax (A) | 200 | 180 | 200 | 200 | 190 | 200 | 200 | 200 | 200 | 190 | 200 | 200 |
| Overshoot (V) | 760 | 770 | 670 | 790 | 590 | 700 | 660 | 760 | 790 | 670 | 570 | 800 |
| Clamps (V): | | | | | | | | | | | | |
| 25 ns | 85 | 80 | 99 | 87 | 72 | 70 | 67 | 63 | 64 | 97 | 102 | 73 |
| 50 ns | 78 | 63 | 86 | 70 | 60 | 54 | 50 | 48 | 56 | 81 | 80 | 59 |
| 100 ns | 58 | 49 | 56 | 50 | 42 | 44 | 40 | 42 | 47 | 74 | 65 | 47 |
| 150 ns | 50 | 38 | 41 | 38 | 33 | 32 | 37 | 32 | 32 | 51 | 53 | 39 |
| Initial Resistance | 41 G | | | | | | | | | | | |
| Final Resistance | 1.2 G | | | | | | | | | | | |
| SAMPLE 2 | | | | | | | | | | | | |
| Pulse | 1 | 2 | 3 | 4 | 5 | 6 | 7 | 8 | 9 | 10 | 15 | 25 |
| Imax (A) | 200 | 200 | 200 | 200 | 200 | 200 | 200 | 200 | 190 | 200 | 200 | 200 |
| Overshoot (V) | 710 | 690 | 710 | 780 | 650 | 820 | 830 | 830 | 720 | 880 | 890 | 870 |
| Clamps (V): | | | | | | | | | | | | |
| 25 ns | 111 | 118 | 115 | 112 | 91 | 95 | 97 | 97 | 101 | 113 | 97 | 68 |
| 50 ns | 89 | 89 | 98 | 97 | 77 | 78 | 75 | 75 | 74 | 86 | 70 | 56 |
| 100 ns | 73 | 82 | 71 | 73 | 62 | 58 | 64 | 64 | 62 | 74 | 49 | 46 |
| 150 ns | 64 | 79 | 71 | 64 | 51 | 44 | 50 | 50 | 54 | 67 | 41 | 39 |
| Initial Resistance | 694 G | | | | | | | | | | | |
| Final Resistance | 11 M | | | | | | | | | | | |

TABLE 5

| | | | | | | | | | | | | |
|---|---|---|---|---|---|---|---|---|---|---|---|---|
| Notebook (138s 18R) | | | | | | | | | | | | |
| Gap (mil) | 2.0 | | | | | | | | | | | |
| Test | 15 kV | | | | | | | | | | | |
| MZ Results | | | | | | | | | | | | |
| SAMPLE 1 | | | | | | | | | | | | |
| Pulse | 1 | 2 | 3 | 4 | 5 | 6 | 7 | 8 | 9 | 10 | 15 | 25 |
| Imax (A) | 200 | 200 | 200 | 200 | 200 | 200 | 200 | 200 | 200 | 200 | 200 | 200 |
| Overshoot (V) | 780 | 1200 | 1100 | 1100 | 1200 | 1000 | 1100 | 1000 | 1000 | 1200 | 1100 | 1200 |
| Clamps (V): | | | | | | | | | | | | |
| 25 ns | 91 | 93 | 86 | 78 | 82 | 73 | 74 | 76 | 97 | 101 | 99 | 74 |
| 50 ns | 72 | 78 | 69 | 64 | 65 | 60 | 61 | 59 | 78 | 81 | 80 | 69 |
| 100 ns | 54 | 55 | 50 | 46 | 50 | 47 | 43 | 44 | 50 | 67 | 58 | 53 |
| 150 ns | 46 | 47 | 43 | 39 | 42 | 39 | 36 | 34 | 38 | 56 | 52 | 41 |
| Initial Resistance | 1.2 G | | | | | | | | | | | |
| Final Resistance | 8.1 G | | | | | | | | | | | |
| SAMPLE 2 | | | | | | | | | | | | |
| Pulse | 1 | 2 | 3 | 4 | 5 | 6 | 7 | 8 | 9 | 10 | 15 | 25 |
| Imax (A) | 310 | 300 | 300 | 300 | 310 | 310 | 310 | 310 | 290 | 310 | 310 | 310 |
| Overshoot (V) | 890 | 1200 | 1400 | 1000 | 1200 | 1300 | 1200 | 1300 | 870 | 1200 | 1100 | 1100 |
| Clamps (V): | | | | | | | | | | | | |
| 25 ns | 89 | 88 | 70 | 75 | 74 | 66 | 74 | 68 | 117 | 65 | 79 | 77 |
| 50 ns | 63 | 64 | 56 | 57 | 56 | 54 | 59 | 54 | 58 | 52 | 57 | 50 |
| 100 ns | 51 | 55 | 45 | 47 | 40 | 40 | 51 | 38 | 40 | 46 | 42 | 40 |
| 150 ns | 36 | 42 | 44 | 36 | 38 | 28 | 40 | 39 | 34 | 39 | 35 | 32 |
| Initial Resistance | 11 M | | | | | | | | | | | |
| Final Resistance | 1.5 G | | | | | | | | | | | |

While the specific embodiments have been illustrated and described, numerous modifications come to mind without significantly departing from the spirit of the invention and the scope of protection is only limited by the scope of the accompanying claims.

We claim:

1. A composition for providing protection against electrical overstress, the composition comprising:

an insulating binder;

doped semiconductive particles comprising from about ten to about sixty percent by volume of the composition; and semiconductive particles, the doped semiconductive particles and the semiconductive particles sized and shaped to be mixed in the binder and constructed and arranged within the binder to be laminated into an electrode gap.

2. The composition of claim 1, further including insulative particles.

3. The composition of claim 1, wherein a volume percentage of the insulating binder is in a range of about 30–65% of the total composition, a volume percentage of the doped semiconductive particles is in a range of about 10–60% of the total composition, and a volume percentage of the semiconductive particles is in a range of about 5–45% of the total composition.

4. The composition of claim 2, wherein a volume percentage of the insulating binder is in a range of about 30–65% of the total composition, a volume percentage of the doped semiconductive particles is in a range of about 10–60% of the total composition, a volume percentage of the semiconductive particles is in a range of about 5–45% of the total composition, and a volume percentage of the insulative particles is in a range of about 1–15% of the total composition.

5. The composition of claim 1, wherein the insulating binder comprises a silicone resin.

6. The composition of claim 5, wherein the silicone resin is cross-linked with a peroxide curing agent.

7. The composition of claim 1, wherein the doped semiconductive particles comprise silicon and a dopant material.

8. The composition of claim 7, wherein the dopant material comprises aluminum.

9. The composition of claim 7, wherein the dopant material comprises iron.

10. The composition of claim 1, wherein the semiconductive particles are comprised from a material selected from the group consisting of silicon, germanium, silicon carbide, boron nitride, boron phosphide, gallium nitride, gallium phosphide, indium phosphide, cadmium phosphide, zinc oxide, cadmium sulphide, and zinc sulphide.

11. The composition of claim 2, wherein the insulative particles are comprise from a material selected from the group consisting of fumed silica, glass, calcium carbonate, calcium sulphate, barium sulphate, aluminum trihydrate, titanium dioxide, kaolin, and kaolinite.

12. The composition of claim 1, wherein the doped semiconductive particles have an average particle size less than 10 microns.

13. The composition of claim 1, wherein the semiconductive particles have an average particle size less than 5 microns.

14. The composition of claim 2, wherein the insulative particles have an average particle size in a range of about 50 Angstroms to about 200 Angstroms.

15. A composition for providing protection against electrical overstress, the composition comprising:

an insulative binder;

doped semiconductive particles having an average particle size of less than 10 microns;

semiconductive particles having an average particle size of less than 5 microns; and insulative particles having an average particle size in a range of about 50 to about 200 Angstroms, the doped semiconductive particles, the semiconductive particles and the insulative particles sized and shaped to be mixed in the binder and constructed and arranged within the binder to be laminated into an electrode gap.

16. The composition of claim 15, wherein the doped semiconductive particles, the semiconductive particles and the insulative particles have an interparticle spacing of greater than 1,000 Angstroms.

17. A composition for providing protection against electrical overstress, the composition comprising:

an insulating binder;

first semiconductive particles doped with a first material having a first electrical conductivity; and second semiconductive particles doped with a second material having a second electrical conductivity, the first and second doped semiconductive particles sized and shaped to be mixed in the binder and constructed and arranged within the binder to be laminated into an electrode gap.

18. A composition for providing protection against electrical overstress, the composition comprising:

an insulative binder;

conductive particles composed of an inner core and an outer shell; and semiconductive particles, the core and shell conductive particles so positioned and arranged within the binder that the composition has a non-ohmic resistance over a voltage range and exhibits a clamping voltage from about 20 volts to about 2,000 volts.

19. The composition of claim 18, wherein the inner core of the conductive particles is comprised of an electrically insulating material.

20. The composition of claim 19, wherein the outer shell of the conductive particles is comprised of a conductive material.

21. The composition of claim 19, wherein the outer shell of the conductive particles is comprised of a semiconductive material.

22. The composition of claim 19, wherein the outer shell of the conductive particles is comprised of a doped semiconductor material.

23. The composition of claim 19, wherein the outer shell of the conductive particles is comprised of an electrically insulating material other than the material comprising the inner core.

24. The composition of claim 18, wherein the inner core of the conductive particles is comprised of a semiconductive material.

25. The composition of claim 24, wherein the outer shell of the conductive particles is comprised of a conductive material.

26. The composition of claim 24, wherein the outer shell of the conductive particles is comprised of a doped semiconductor material.

27. The composition of claim 24, wherein the outer shell of the conductive particles is comprised of a semiconductive material other than the material comprising the inner core.

28. The composition of claim 18, wherein the inner core of the conductive particles is comprised of a conductive material.

29. The composition of claim 28, wherein the outer shell of the conductive particles is comprised of a semiconductive material.

30. The composition of claim 28, wherein the outer shell of the conductive particles is comprised of a doped semiconductor material.

31. The composition of claim 28, wherein the outer shell of the conductive particles is comprised of a conductive material other than the material comprising the inner core.

32. A composition for providing protection against electrical overstress, the composition comprising:

an insulative binder;

conductive particles composed of an inner core and an outer shell; and doped semiconductive particles comprising from about ten percent to about sixty percent by volume of the composition, the conductive particles and the doped semiconductive particles sized and shaped to be mixed in the binder and constructed and arranged within the binder to be laminated into an electrode gap.

* * * * *